United States Patent
Liu et al.

(10) Patent No.: US 12,450,717 B2
(45) Date of Patent: Oct. 21, 2025

(54) MARK QUALITY INSPECTION METHOD AND APPARATUS, COMPUTER DEVICE, AND STORAGE MEDIUM

(71) Applicants: JIANGSU CONTEMPORARY AMPEREX TECHNOLOGY LIMITED, Changzhou (CN); CONTEMPORARY AMPEREX TECHNOLOGY CO., LIMITED, Ningde (CN)

(72) Inventors: Kun Liu, Changzhou (CN); Lei Song, Changzhou (CN); Guangcheng Zhong, Changzhou (CN)

(73) Assignees: JIANGSU CONTEMPORARY AMPEREX TECHNOLOGY LIMITED, Changzhou (CN); CONTEMPORARY AMPEREX TECHNOLOGY CO, LIMITED, Ningde (CN)

( * ) Notice: Subject to any disclaimer, the term of this patent is extended or adjusted under 35 U.S.C. 154(b) by 145 days.

(21) Appl. No.: 18/466,834

(22) Filed: Sep. 14, 2023

(65) Prior Publication Data
US 2024/0070843 A1 Feb. 29, 2024

Related U.S. Application Data

(63) Continuation of application No. PCT/CN2023/084409, filed on Mar. 28, 2023.

(30) Foreign Application Priority Data

Aug. 30, 2022 (CN) .......................... 202211062329.1

(51) Int. Cl.
*G06K 9/36* (2006.01)
*G06K 7/14* (2006.01)
(Continued)

(52) U.S. Cl.
CPC .......... *G06T 7/0004* (2013.01); *G06K 7/1417* (2013.01); *G06T 7/60* (2013.01);
(Continued)

(58) Field of Classification Search
CPC ................. G06T 7/0004; G06T 7/0002; G06T 2207/30108; G06K 7/1417; G06K 7/1413; G06K 1/121
(Continued)

(56) References Cited

U.S. PATENT DOCUMENTS 12,272,133 B2 * 4/2025 Pegurri .................. G06V 20/80
2007/0205258 A1 * 9/2007 Self ........................ G06Q 30/06
235/375
(Continued)

FOREIGN PATENT DOCUMENTS

CN 109389150 A 2/2019
CN 111611821 A 9/2020
(Continued)

OTHER PUBLICATIONS

International Search Report received in the corresponding International Application PCT/CN2023/084409, mailed Jun. 23, 2023.
(Continued)

*Primary Examiner* — Daniel St. Cyr
(74) *Attorney, Agent, or Firm* — K&L Gates LLP

(57) ABSTRACT

This application relates to a mark quality inspection method and apparatus, a computer device, and a storage medium. The method includes: acquiring a marked-product image obtained by photographing a marked product upon completion of a marking operation on a product; performing image identification on the marked-product image to obtain a mark quality identification result of an identification code in the marked-product image; and outputting a first indication signal under a condition that the mark quality identification
(Continued)

result is normal, where the first indication signal is used to indicate that the marked product flows to a process subsequent to the marking operation. In embodiments of this application, mark quality problems can be found in a timely manner, reducing cases of undesirable mark quality and defectiveness of mass-produced products.

18 Claims, 11 Drawing Sheets

(51) Int. Cl.
      *G06T 7/00*         (2017.01)
      *G06T 7/60*         (2017.01)
      *G06T 7/70*         (2017.01)

(52) U.S. Cl.
      CPC ...... *G06T 7/70* (2017.01); *G06T 2207/30108* (2013.01); *G06T 2207/30204* (2013.01)

(58) Field of Classification Search
      USPC .................................... 235/462.1, 385, 380
      See application file for complete search history.

(56) References Cited

U.S. PATENT DOCUMENTS

| | | | |
|---|---|---|---|
| 2008/0011841 A1* | 1/2008 | Self | G06Q 30/06 235/494 |
| 2011/0206269 A1 | 8/2011 | Tyler et al. | |
| 2015/0102100 A1* | 4/2015 | Hattrup | G06K 15/1835 53/64 |
| 2018/0033016 A1* | 2/2018 | Mayman | G06Q 30/012 |
| 2019/0197562 A1* | 6/2019 | Woerner | H04L 9/12 |
| 2019/0220629 A1 | 7/2019 | Nadabar et al. | |
| 2022/0356012 A1* | 11/2022 | Brown | B31B 70/88 |

FOREIGN PATENT DOCUMENTS

| | | |
|---|---|---|
| CN | 111738028 A | 10/2020 |
| CN | 111767754 A | 10/2020 |
| CN | 112001200 A | 11/2020 |
| CN | 113485318 A | 10/2021 |
| CN | 114170432 A | 3/2022 |
| CN | 114330404 A | 4/2022 |
| CN | 115131741 A | 9/2022 |
| JP | 2006236135 A | 9/2006 |

OTHER PUBLICATIONS

Written Opinion received in the corresponding International Application PCT/CN2023/084409, mailed Jun. 23, 2023.
First Office Action received in the corresponding Chinese Application 202211062329.1 mailed Oct. 13, 2022.
Second Office Action received in the corresponding Chinese Application 202211062329.1, mailed Nov. 3, 2022.
Third Office Action received in the corresponding Chinese Application 202211062329.1, mailed Apr. 26, 2023.
Rejection Decision received in the corresponding Chinese Application 202211062329.1, mailed Jan. 9, 2023.
Notice of Grant of Invention Patent Right received in the corresponding Chinese Application 202211062329.1, mailed Jun. 20, 2023.
The extended European search report received in the counterpart EP application No. 23729929.2, dated Jun. 6, 2025, 9 pages.

* cited by examiner

MARK QUALITY INSPECTION METHOD AND APPARATUS, COMPUTER DEVICE, AND STORAGE MEDIUM

CROSS-REFERENCE TO RELATED APPLICATIONS

This application is a continuation of International Application No. PCT/CN2023/084409, filed on Mar. 28, 2023, which claims priority to Chinese Patent Application No. 2022110623291, filed on Aug. 30, 2022 and entitled "MARK QUALITY INSPECTION METHOD AND APPARATUS, COMPUTER DEVICE, AND STORAGE MEDIUM", which is incorporated herein by reference in its entirety.

TECHNICAL FIELD

This application relates to the field of manufacturing technologies, and in particular, to a mark quality inspection method and apparatus, a computer device, a computer-readable storage medium, and a computer program product.

BACKGROUND

With the development of manufacturing and computer technologies, during manufacturing of a product, a marking operation is performed on the manufactured product, so that the authenticity and/or source of the product can be identified after the product is sold. The marking operation refers to marking an identification code on the manufactured product through engraving or by other means. The identification code may be a quick response code. For example, during manufacturing of a prismatic lithium battery, a quick response code is generally engraved on the top cover of the prismatic lithium battery.

To determine the mark quality of a marking operation performed during product manufacturing, the mark quality of the product needs to be inspected.

SUMMARY

Based on this, embodiments of this application provide a mark quality inspection method and apparatus, a computer device, a computer-readable storage medium, and a computer program product.

According to a first aspect, this application provides a mark quality inspection method. The method includes:
  acquiring a marked-product image obtained by photographing a marked product upon completion of a marking operation on a product;
  performing image identification on the marked-product image to obtain a mark quality identification result of an identification code in the marked-product image; and
  outputting a first indication signal under a condition that the mark quality identification result is normal, where the first indication signal is used to indicate that the marked product flows to a process subsequent to the marking operation.

In the technical solution according to this embodiment of this application, after the marking operation is completed on the product, the marked product is photographed in real time to obtain the marked-product image, and image identification is performed on the marked-product image to obtain the mark quality identification result of the product. If the mark quality identification result is normal, the marked product flows to a process subsequent to the marking operation. In this way, the mark quality can be inspected in real time, and manual inspection of the first product can be avoided, so that mark quality problems can be detected in a timely manner and the possibility of undesirable mark quality and defectiveness of mass-produced products is effectively reduced.

In some embodiments, the performing image identification on the marked-product image to obtain a mark quality identification result of an identification code in the marked-product image includes:
  identifying an identification code image in the marked-product image; and
  comparing whether the identification code image is consistent with an identification code mark image corresponding to the product to obtain an image consistency comparison result, where
  the mark quality identification result includes the image consistency comparison result.

In this way, during mark quality inspection, the identification code mark image corresponding to the product is obtained, the identification code image is identified from the marked-product image, and the identification code image is compared with the identification code mark image for checking consistency, so as to learn about whether the identification code marked on the product is complete, thereby increasing the possibility of determining that the identification code marked on the product is a correct identification code.

In some embodiments, the performing image identification on the marked-product image to obtain a mark quality identification result of an identification code in the marked-product image includes:
  determining identification code size information of the identification code image; and
  comparing the identification code size information against a preset size range to obtain a mark size identification result, where
  the mark quality identification result includes the mark size identification result.

For mass-produced products, such identification code is generally marked on the products at a preset size. In other words, the identification codes marked on the mass-produced products should be consistent in size. In this way, whether the size of the marked identification code meets the requirement can be determined by comparing the identification code size information, increasing the possibility that the identification codes on the products are consistent in size.

In some embodiments, the performing image identification on the marked-product image to obtain a mark quality identification result of an identification code in the marked-product image includes:
  determining mark position information of the identified identification code image in the marked product; and
  obtaining a mark position detection result based on the mark position information; where
  the mark quality identification result includes the mark position detection result.

For mass-produced products, such identification code is generally marked at a specified position on the products. In this way, it can be determined by comparing the mark position information that the identification code is marked at a specified position on the product. This increases the possibility that the identification codes on the products are consistent in position.

In some embodiments, the mark position information includes: a first distance of the quick response code image with respect to a first product boundary of the marked product, and a second distance with respect to a second product boundary of the marked product; and the obtaining a mark position detection result based on the mark position information includes:

under a condition that the first distance falls within a first preset distance range and the second distance falls within a second preset distance range, determining that the mark position detection result is the mark position being accurate.

In this way, based on the first product boundary and the second product boundary of the marked product, a distance of the identification code marked on the product with respect to the product boundary can be determined, so as to determine whether the mark position is accurate, featuring easy implementation.

In some embodiments, the performing image identification on the marked-product image to obtain a mark quality identification result of an identification code in the marked-product image includes:

identifying a digital code in the marked-product image; and comparing whether the digital code is consistent with digital code content corresponding to the product to obtain a digital code comparison result; where the mark quality identification result includes the digital code comparison result.

During the marking operation on some products, some digital codes may be marked together with the identification code. Therefore, the digital code is identified and compared against the digital code content for checking consistency. In this way, the marking accuracy of the digital code content can be determined.

In some embodiments, the method further includes:

outputting a second indication signal under a condition that the mark quality identification result is abnormal, where the second indication signal is used to indicate pulling the marked product off a belt.

Therefore, when the mark quality identification result is abnormal, it can be indicated in a timely manner to pull the marked product off the belt, reducing the possibility that a marked product with an abnormal mark flows to the next process.

In some embodiments, the method further includes:

outputting a third indication signal under a condition that the second indication signal has been consecutively output for a preset number of times, where the third indication signal is used to control shutdown of a device.

In this way, when the mark quality identification result is abnormal for the preset number of consecutive times, it can be indicated in a timely manner that the device needs to be shut down and repaired, so as to reduce the possibility of mass production accidents during marking.

According to a second aspect, this application provides a mark quality inspection apparatus. The apparatus includes:

an image acquisition module, configured to acquire a marked-product image obtained by photographing a marked product upon completion of a marking operation on a product;

an image processing module, configured to perform image identification on the marked-product image to obtain a mark quality identification result of an identification code in the marked-product image; and a signal output module, configured to output a first indication signal under a condition that the mark quality identification result obtained by the image processing module is normal, where the first indication signal is used to indicate that the marked product flows to a process subsequent to the marking operation.

According to a third aspect, this application provides a computer device including a memory and one or more processors. The memory stores computer-readable instructions, and when the computer-readable instructions are executed by the one or more processors, the steps of the foregoing mark quality inspection method are executed by the one or more processors.

According to a fourth aspect, this application provides one or more computer-readable storage media storing computer-readable instructions. When the computer-readable instructions are executed by one or more processors, the steps of the foregoing mark quality inspection method are executed by the one or more processors.

According to a fifth aspect, this application provides a computer program product. The computer program product includes a computer program. When the computer program is executed by one or more processors, the steps of the foregoing mark quality inspection method are executed by the one or more processors.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are denoted by same reference signs. In the accompanying drawings.

Figure 1:
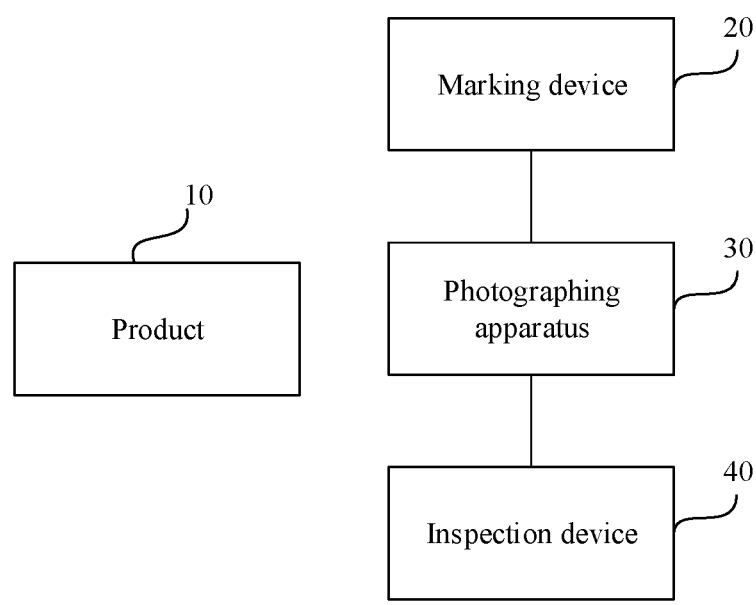
FIG. 1 is a diagram of an application environment for a mark quality inspection method according to some embodiments of this application.
Figure 2:
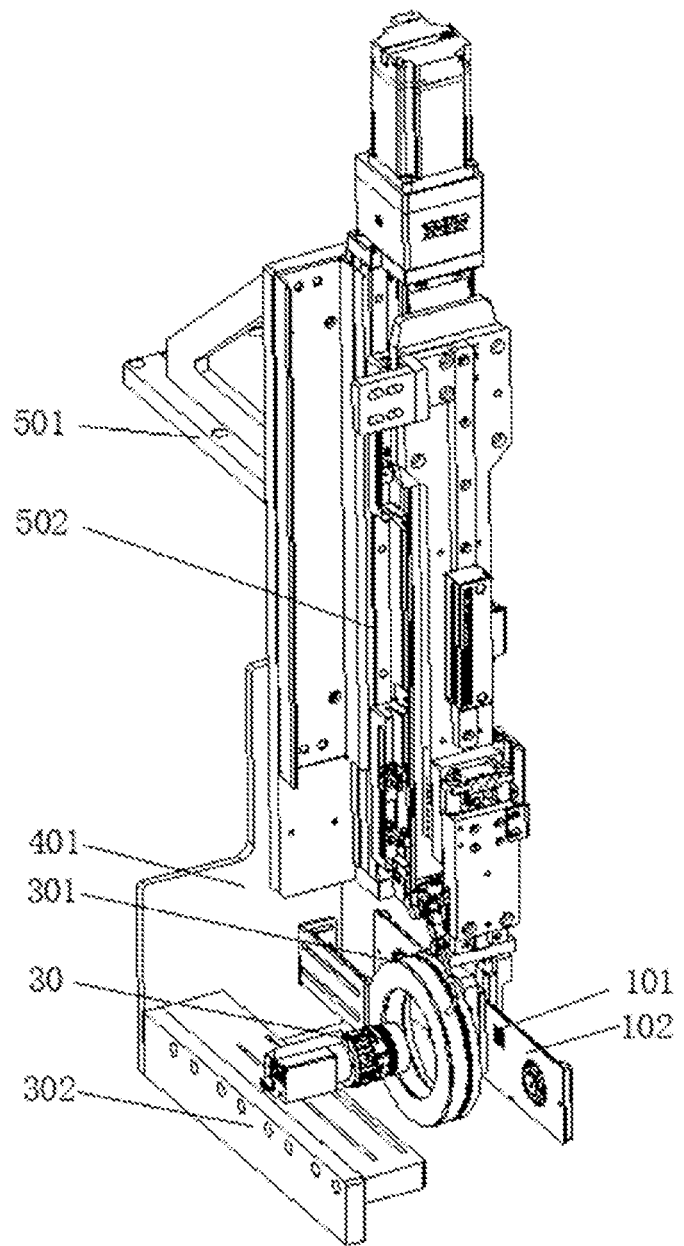
FIG. 2 is a schematic diagram of a marked product positioned with respect to a photographing apparatus at one angle according to some embodiments of this application.
Figure 3:
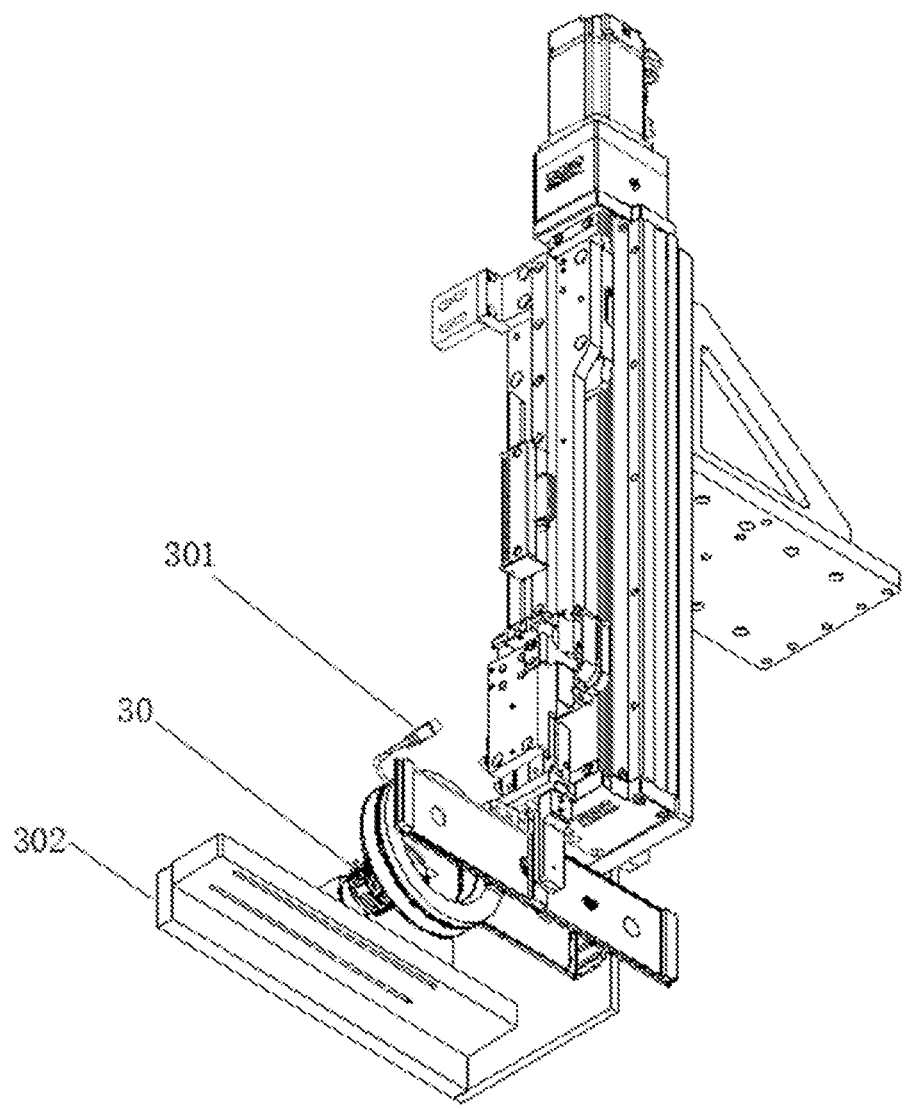
FIG. 3 is a schematic diagram of a marked product positioned with respect to a photographing apparatus at another angle according to some embodiments of this application.
Figure 4:
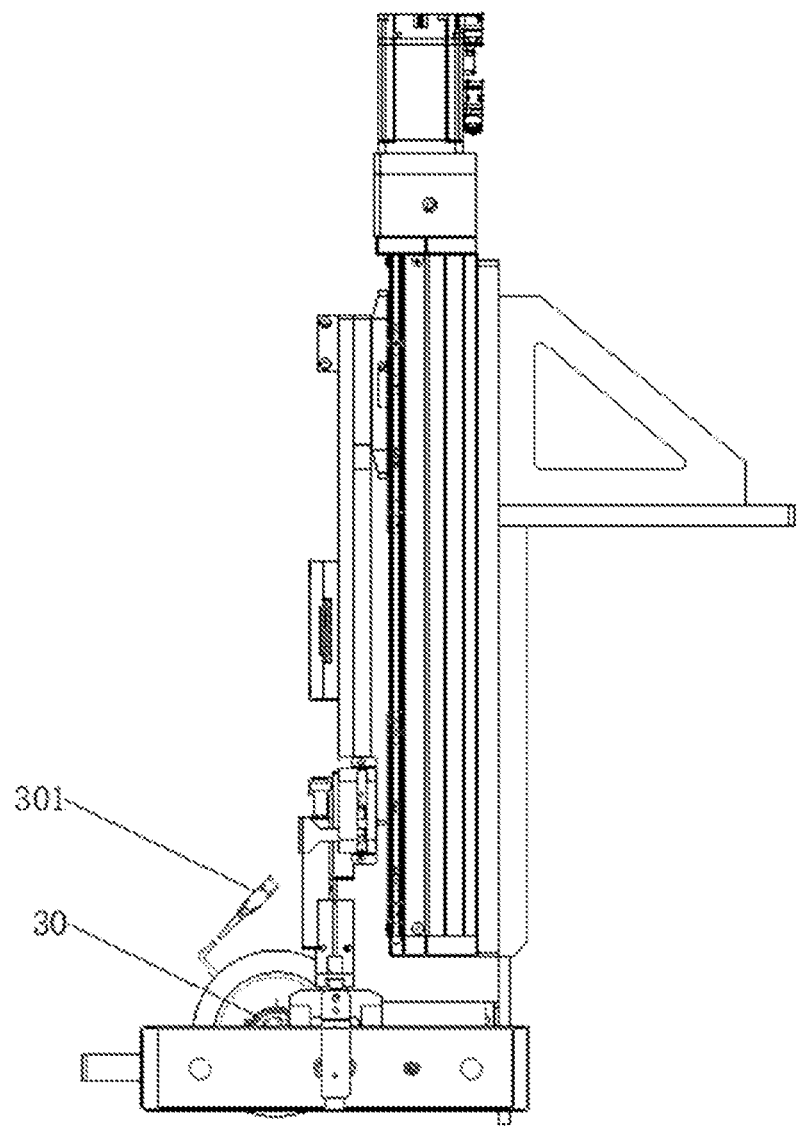
FIG. 4 is a schematic diagram of a marked product positioned with respect to a photographing apparatus at another angle according to some embodiments of this application.
Figure 5:
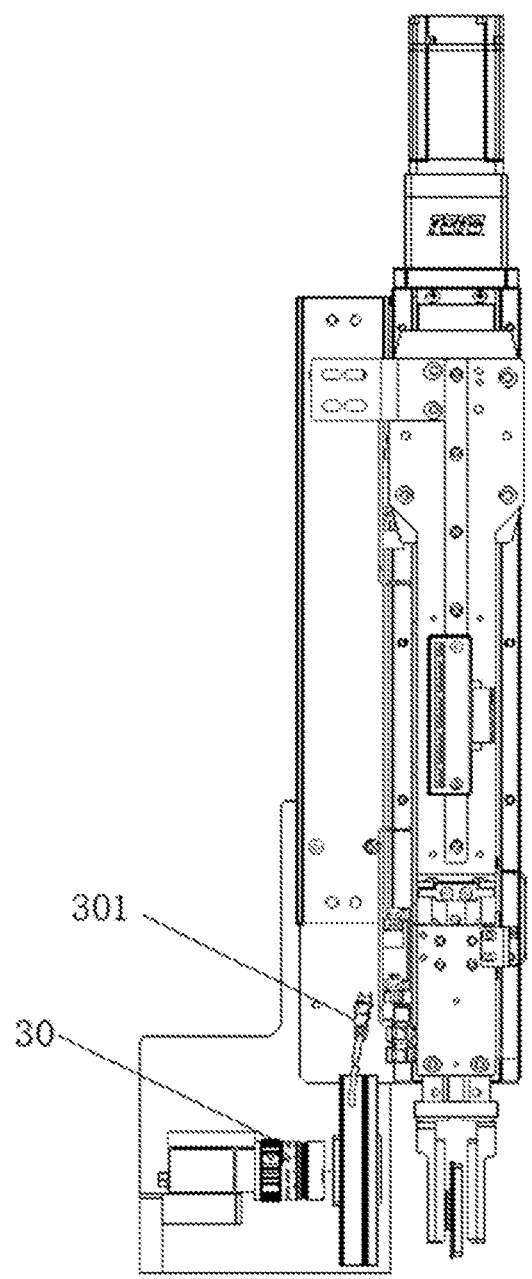
FIG. 5 is a schematic diagram of a marked product positioned with respect to a photographing apparatus at another angle according to some embodiments of this application.
Figure 6:
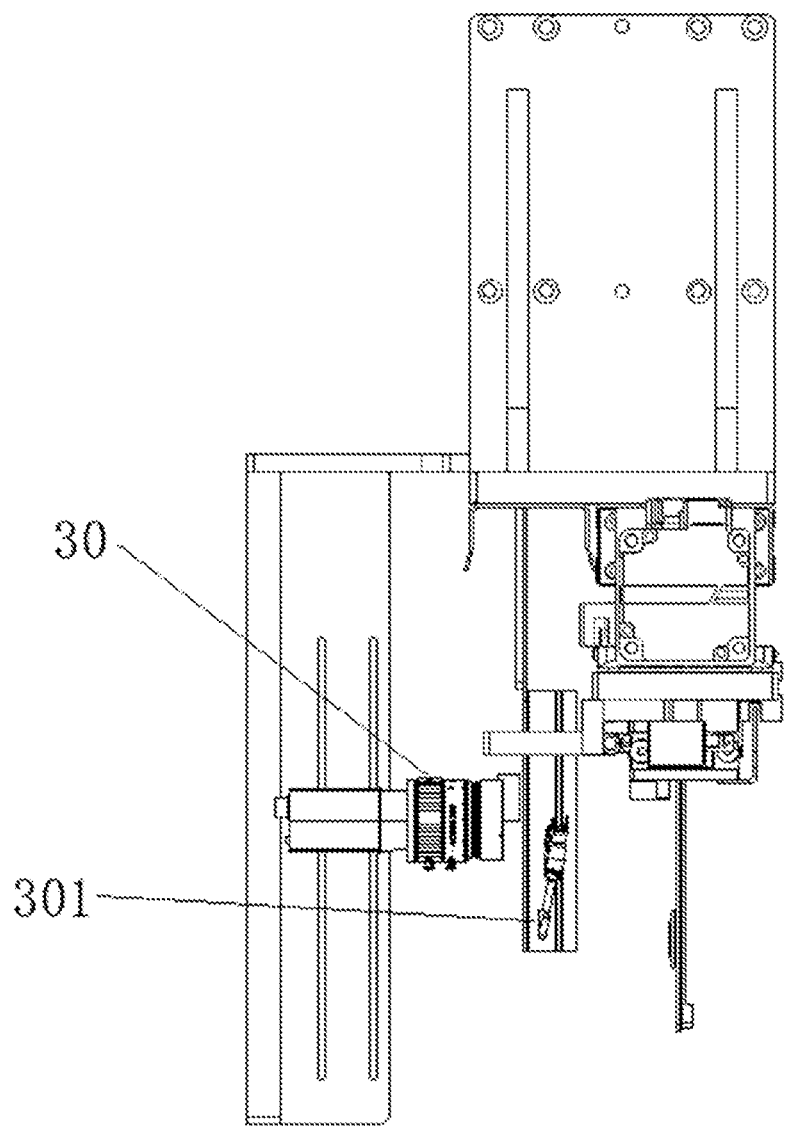
FIG. 6 is a schematic diagram of a marked product positioned with respect to a photographing apparatus at another angle according to some embodiments of this application.

Reference signs in specific embodiments are as follows:
product 10; quick response code 101; top cover 102; digital code 103;
marking device 20;
photographing apparatus 30; camera light source 301; camera mounting bracket 302;
inspection device 40; inspection device supporting plate 401;
X-axis traverse servo mounting plate 501; Z-axis servo robot arm 502;
image acquisition module 100; image processing module 200; and signal output module 300.

DESCRIPTION OF EMBODIMENTS

To make the objectives, technical solutions, and advantages of this application more comprehensible, the following describes this application in detail with reference to accompanying drawings and embodiments. It should be understood that the specific embodiments described herein are used to explain this application only but are not intended to limit this application.

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application belongs. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as an indication or implication of relative importance or implicit indication of the number, specific sequence or dominant-subordinate relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

At present, according to the market development, requirements for identifying the authenticity and source of products are increasing. Therefore, marking an identification code on products during manufacturing has become more extensive in demand and application. A specific marking operation may be marking an identification code on a product by means of engraving, label attaching, or others. The identification code marked on the product is typically a quick response code.

With the expansion of traction battery application, during production of traction batteries, for example, prismatic lithium batteries, a quick response code is generally marked on a specified position of the traction batteries, for example, on the top cover.

To determine the mark quality of a marking operation during product manufacturing, a general practice is manually inspecting whether the mark quality of the first marked product meets the requirements before mass production. If the requirements are met, it indicates that the marking operation is normal, and then the machine is controlled to continue the marking operation on all the rest of products. In this case, the mark quality is generally no longer inspected during subsequent marking operation on all products. Therefore, once an exception occurs for marking during this process, the mark quality of the entire batch of products will be unsatisfactory, causing a batch of defective products.

To reduce the cases of undesirable mark quality and defectiveness of mass-produced products, based on the solution according to the embodiments of this application, the mark quality of a marked product is inspected after the marking operation is completed. The marked product can flow to a subsequent process only when the mark quality identification result is normal. In this way, mark quality problems can be found in a timely manner, reducing cases of undesirable mark quality and defectiveness of mass-produced products.

The method according to the embodiments of this application can be applied to scenarios where a marking operation needs to be performed on products during production, manufacturing, or other processes, for example, a production scenario where prismatic lithium batteries are marked during production. Referring to FIG. 1, this production scenario relates to a manufactured product 10, for example, a prismatic lithium battery, and further relates to a marking device 20, a photographing apparatus 30, and an inspection device 40. It should be understood that only part of devices used in this scenario are described as an example, and more devices will be included in actual production scenarios. The marking device 20 is used to mark a code on the product 10, for example, mark a quick response code on the product 10. A marked product is obtained after the marking operation is completed. Then, the marked product becomes the product 10 marked with a quick response code. The photographing apparatus 30 photographs the marked product to obtain a marked-product image, and the inspection device 40 performs image identification on the marked-product image to obtain a mark quality identification result. In some embodiments, the inspection device 40 may be a device independent of or integrally provided with the photographing apparatus 30. In some other embodiments, the inspection device 40 may alternatively be a device for controlling the entire flow of product generation, for example, a master control device or a host computer.

Also referring to FIG. 2 to FIG. 6, the photographing apparatus 30 may be placed facing a side, marked with a quick response code, of the prismatic lithium battery, and the prismatic lithium battery is located within a photographing range of the photographing apparatus 30. In some embodiments, a focal axis of the photographing apparatus 30 may be perpendicular to the side, marked with a quick response code, of the prismatic lithium battery. A camera light source 301 may be further provided to fill in light to enhance brightness for the photographing apparatus 30 during photographing. The photographing apparatus 30 may be mounted on a camera mounting bracket 302, and the camera light source 301 may be provided above the camera. In an example scenario of this embodiment, an X-axis traverse servo mounting plate 501 and a Z-axis servo robot arm 502 may be further provided. The Z-axis servo robot arm 502 is provided on the X-axis traverse servo mounting plate 501. During operation, the Z-axis servo robot arm 502 grabs a marked product and rises to a starting position, and the photographing apparatus 30 takes a picture and uploads the picture to the inspection device 40 for inspection.

Figure 7:
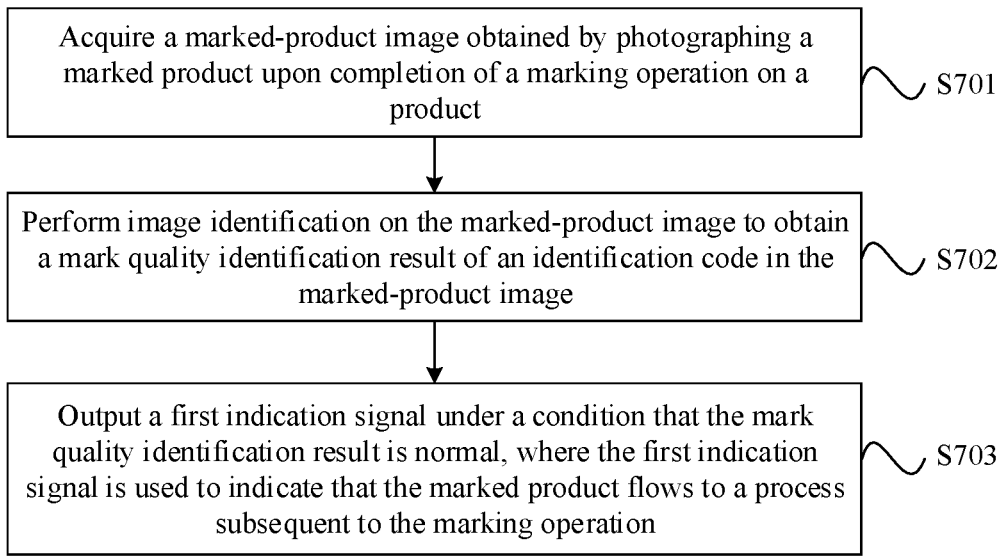
FIG. 7 is a schematic flowchart of a mark quality inspection method according to some embodiments of this application.

According to some embodiments of this application, referring to FIG. 7, a mark quality inspection method is provided. The method can be applied to the inspection device 40 shown in FIG. 1. The method includes step S701 to step S703.

Step S701. Acquire a marked-product image obtained by photographing a marked product upon completion of a marking operation on a product.

The marked product refers to a product on which the marking operation is completed. In the case of proper marking operation and correct marking, the marked product is a product marked with an identification code after the marking operation is completed. The identification code may be a quick response code. The following embodiments are described assuming that the identification code is a quick response code. The identification code may be marked on the product in various possible manners.

The marked-product image is an image obtained by photographing the marked product.

Completion of the marking operation means that the marking process on a product is completed. After the marking process on a product is completed, the photographing apparatus may take a picture to obtain the marked-product image. In some embodiments, the marking device may send information to the photographing apparatus upon completion of the marking operation on the product. The photographing apparatus receives the information, takes a picture to obtain the marked-product image, and sends the obtained marked-product image to the inspection device for inspection. In some embodiments, a master control device may be provided. The marking device sends information to the master control device upon completion of product marking. The master control device receives the information, and sends a photographing command to the photographing apparatus, so that the photographing apparatus is controlled to photograph the marked product to obtain the marked-product image. It should be understood that in other embodiments, the marked-product image may alternatively be obtained in real time by other means.

Step S702. Perform image identification on the marked-product image to obtain a mark quality identification result of an identification code in the marked-product image.

The image identification may be performed on the marked-product image in various possible manners. For example, the identification code in the marked-product image may be inspected to obtain a mark quality identification result, so as to determine the mark quality of the marked product.

Step S703. Output a first indication signal under a condition that the mark quality identification result is normal, where the first indication signal is used to indicate that the marked product flows to a process subsequent to the marking operation.

If the mark quality identification result is normal, it means that the marking operation on the current product is proper and no mark quality problem is found. In this case, the first indication signal can be output to indicate that the marked product flows to a process subsequent to the marking operation, and the marking operation process is completed.

In the technical solution according to this embodiment of this application, after the marking operation is completed on the product, the marked product is photographed in real time to obtain the marked-product image, and image identification is performed on the marked-product image to obtain the mark quality identification result of the product. If the mark quality identification result is normal, the marked product flows to a process subsequent to the marking operation. Therefore, the mark quality can be inspected in real time. This can detect mark quality problems in a timely manner, effectively reducing the possibility of undesirable mark quality and defectiveness of mass-produced products.

Figure 8:
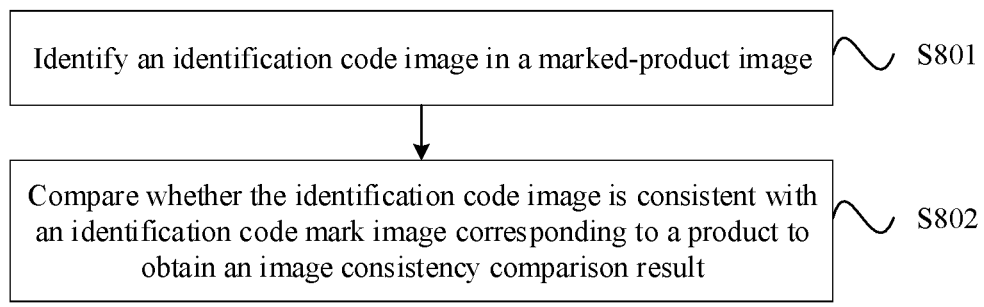
FIG. 8 is a schematic flowchart of performing image identification on a marked-product image to obtain a mark quality identification result according to some embodiments of this application.

According to some embodiments of this application, optionally, referring to FIG. 7 and FIG. 8, step S702 of performing image identification on the marked-product image to obtain a mark quality identification result of an identification code in the marked-product image includes step S801 and step S802.

Step S801. Identify an identification code image in the marked-product image.

The identification code image refers to a portion of the marked-product image including the identification code. The identification code being a quick response code is used as an example. The identification code may be a portion of a quick response code identified from the marked-product image.

The identification code image may be identified from the marked-product image in various possible manners. For example, a reference point of the marked-product image is identified, and the identification code is identified based on the reference point. For another example, the identification code image is identified from the marked-product image based on image characteristics of the identification code.

After the identification code image is identified, the identification code image can be segmented from the marked-product image for subsequent comparison.

Step S802. Compare whether the identification code image is consistent with an identification code mark image corresponding to the product to obtain an image consistency comparison result.

The identification code mark image corresponding to the product refers to a predetermined image to be marked on the product, and the identification code mark image can be obtained from the host computer or the master control device. During the marking operation, for the purpose of source tracing, the identification codes marked for products are generally different. Therefore, during the marking operation on a product, the host computer or the master control device sends an identification code mark image of the product to the marking device, and then the marking device performs marking operation. In this embodiment of this application, the host computer or the master control device also sends the identification code mark image to the inspection device. The inspection device compares the identification code image obtained by segmentation against the identification code mark image to obtain the image consistency comparison result.

The foregoing mark quality identification result includes the image consistency comparison result.

During comparison for checking consistency between the identification code image and the identification code mark image corresponding to the product, pixel values of the identification code image and the identification code mark image may be compared directly, reference points of the identification code image and the identification code mark image may be compared, or comparison may be performed by other means, so as to obtain the image consistency comparison result, which is not specifically limited in this embodiment of this application. In this way, the image consistency comparison result can be obtained by simply comparing the identification code image against the identification code mark image itself, with no need to acquire specific content of the identification code by scanning the code.

The foregoing image consistency comparison result may be consistent images or inconsistent images. If the images are consistent, it means that the identification code image is complete. If the images are inconsistent, the identification code image is defective, and the image may be incomplete.

During mark quality inspection, the identification code mark image corresponding to the product is obtained, the identification code image is identified from the marked-product image, and the identification code image is compared with the identification code mark image for checking consistency, so as to learn about whether the identification code marked on the product is complete, thereby determining the correctness of the identification code marked on the product. It should be understood that the identification code mark image is a predetermined image to be marked on the product. During comparison for checking consistency between the identification code image and the identification code mark image, if the identification code image is complete, it means that the identification code mark image is completely marked on the product. In other words, the identification code image marked on the product is correct and the same as the identification code mark image. In this way, the correctness of the identification code can be determined without identifying the content of the identification code.

Figure 9:
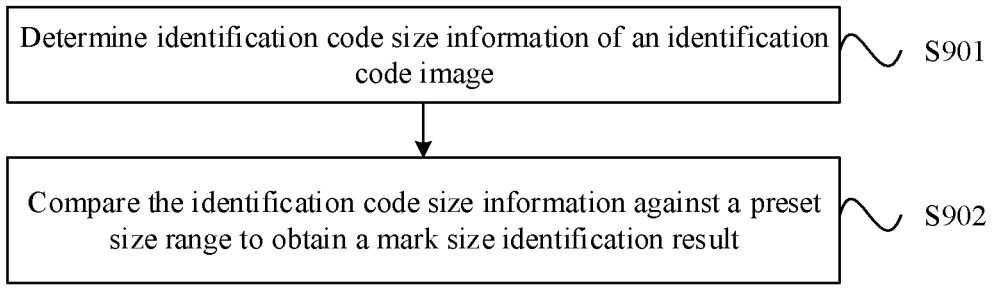
FIG. 9 is a schematic flowchart of performing image identification on a marked-product image to obtain a mark quality identification result according to some other embodiments of this application.

According to some embodiments of this application, optionally, referring to FIG. 7 and FIG. 9, step S702 of performing image identification on the marked-product image to obtain a mark quality identification result of an identification code in the marked-product image further includes step S901 and step S902.

Step S901. Determine identification code size information of the identification code image.

The identification code size information is information that can represent the size of an identified identification code image. The identification code being a quick response code is used as an example. The quick response code is generally a rectangular pattern. Therefore, the identification code size information may refer to length of each side of a rectangular area of the identification code image.

Step S902. Compare the identification code size information against a preset size range to obtain a mark size identification result. In this case, the mark quality identification result includes the mark size identification result.

The preset size range may be a preset range of size of the identification code marked on the product. The preset size range may be obtained from the master control device or the host computer. For mass-produced products, the size range is generally unchanged for all products, so the preset size range may also be set in the inspection device in advance.

The identification code being a quick response code is used as an example. In some embodiments, the preset size range may be a length range of two opposite sides of the rectangular area and a length range of the other two opposite sides of the rectangular area. In some other embodiments, the preset size range may be length of two opposite sides of the rectangular area and length of the other two opposite sides of the rectangular area, and a margin of error may be preset for the length, which is not specifically limited in the embodiments of this application.

The mark size identification result may conform to the preset size range or may not conform to the preset size range. If the result conforms to the preset size range, it means that the size of the identification code image is normal. If the result does not conform to the preset size range, it means that the size of the identification code image is abnormal and does not meet the size requirement.

For mass-produced products, an identification code is generally marked on the products at a preset size. In other words, the identification codes marked on the mass-produced products should be consistent. In this case, whether the size of the marked identification code meets the requirement can be determined by comparing the identification code size information, increasing the possibility that the identification codes on the products are consistent in size.

Figure 10:
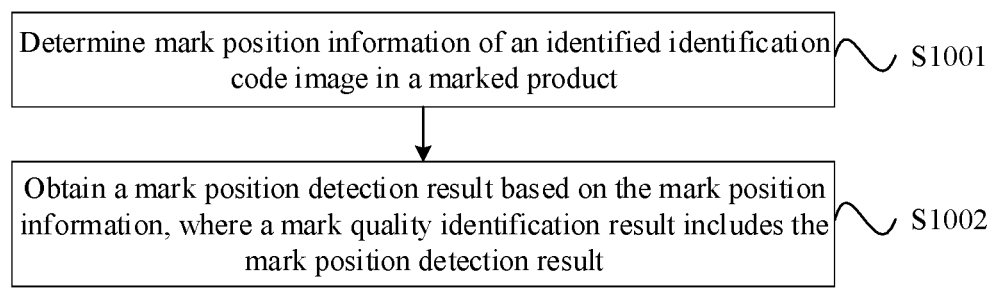
FIG. 10 is a schematic flowchart of performing image identification on a marked-product image to obtain a mark quality identification result according to some other embodiments of this application.

According to some embodiments of this application, optionally, referring to FIG. 7 and FIG. 10, step S702 of performing image identification on the marked-product image to obtain a mark quality identification result of an identification code in the marked-product image further includes step S1001 and step S1002.

Step S1001. Determine mark position information of the identified identification code image in the marked product.

The mark position information refers to position-related information of the identification code on the product after marking is completed. The mark position information may be determined in combination with a reference position on the product, for example, product boundary information. The product being a prismatic lithium battery is used as an example. The reference position may be a position on the top cover of the prismatic lithium battery, and the mark position information may be a distance between the identification code in the marked-product image and the top cover of the prismatic lithium battery.

Step S1002. Obtain a mark position detection result based on the mark position information. The mark quality identification result includes the mark position detection result.

The mark position detection result may be a detection result whether the identification code is in the specified position, that is, whether the identification code deviates from the mark position. If the mark position detection result shows no deviation from the mark position, the inspection is successful, and if the mark position detection result shows a deviation from the mark position, the inspection fails.

For mass-produced products, the identification code is generally marked at a specified position on the products. In this case, it can be determined by comparing the mark position information that the identification code is marked at the specified position on the product. This increases the possibility that the identification codes on the products are consistent in position.

According to some embodiments of this application, optionally, the mark position information includes: a first distance of the identification code image with respect to a first product boundary of the marked product, and a second distance with respect to a second product boundary of the marked product.

In this case, step S1002 of obtaining a mark position detection result based on the mark position information includes:

under a condition that the first distance falls within a first preset distance range and the second distance falls within a second preset distance range, determining that the mark position detection result is the mark position being accurate.

The first product boundary and the second product boundary may be boundaries associated with the product structure, and specifically in the embodiments of this application, may be boundaries of a side of the product bearing the identification code. The first product boundary and the second product boundary may be two adjacent boundaries of the product.

Based on the first product boundary and the second product boundary of the marked product, a distance of the identification code marked on the product with respect to the product boundary can be determined, so as to determine whether the mark position is accurate, featuring easy implementation.

Figure 11:
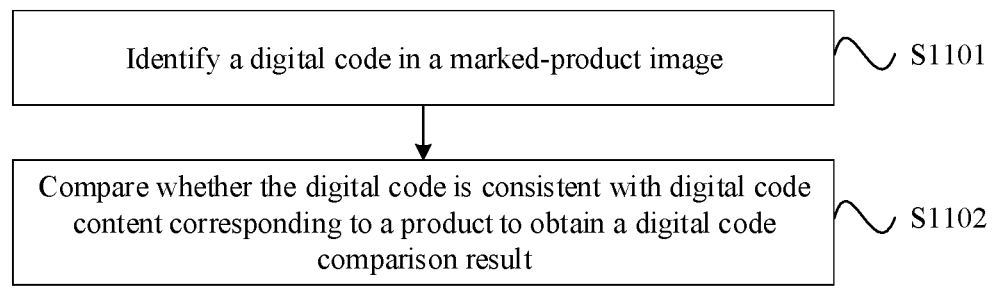
FIG. 11 is a schematic flowchart of performing image identification on a marked-product image to obtain a mark quality identification result according to some other embodiments of this application.

According to some embodiments of this application, optionally, referring to FIG. 11, step S702 of performing image identification on the marked-product image to obtain a mark quality identification result of an identification code in the marked-product image further includes steps S1101 and step S1102.

Step S1101. Identify a digital code in the marked-product image.

Figure 12:
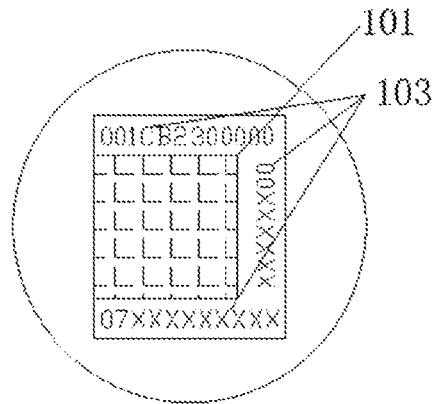
FIG. 12 is a schematic diagram of an identification code according to some embodiments of this application.

The identification code being a quick response code is used as an example. During the marking operation on some products, a digital code is also marked on the product, along with the quick response code. The digital code may be an Arabic number, a letter, or a combination of an Arabic number and a letter. Referring to FIG. 12, a digital code 103 may typically be arranged around a quick response code 101.

The digital code can be used to mark product-related information, so that the digital code or the product-related information can be easily viewed together with the quick response code of the product. Specific information represented by the digital code is not limited in the embodiments of this application.

The specific implementation of identifying a digital code from the marked-product image is not limited in the embodiments of this application. For example, OCR (optical character recognition) can be used to identify the identification code.

Step S1102. Compare whether the digital code is consistent with digital code content corresponding to the product to obtain a digital code comparison result. The mark quality identification result includes the digital code comparison result.

Digital code content of a product refers to predetermined content of the digital code to be marked on the product. The digital code content of the product can be obtained from the host computer or the master control device.

Comparing whether the digital code is consistent with the digital code content corresponding to the product may be directly comparing the identified digital code against the digital code content corresponding to the product to obtain the digital code comparison result.

The digital code comparison result may be a result of comparing the digital code against the digital code content corresponding to the product, that is, a result of whether the content thereof are exactly the same. If the digital code comparison result is being consistent, the inspection is successful; and if the digital code comparison result is being inconsistent, the inspection fails.

During the marking operation on some products, some digital codes may be marked together with the identification code. Therefore, the digital code is identified and compared against the digital code content for checking consistency. In this way, the marking accuracy of the digital code content can be determined.

Figure 13:
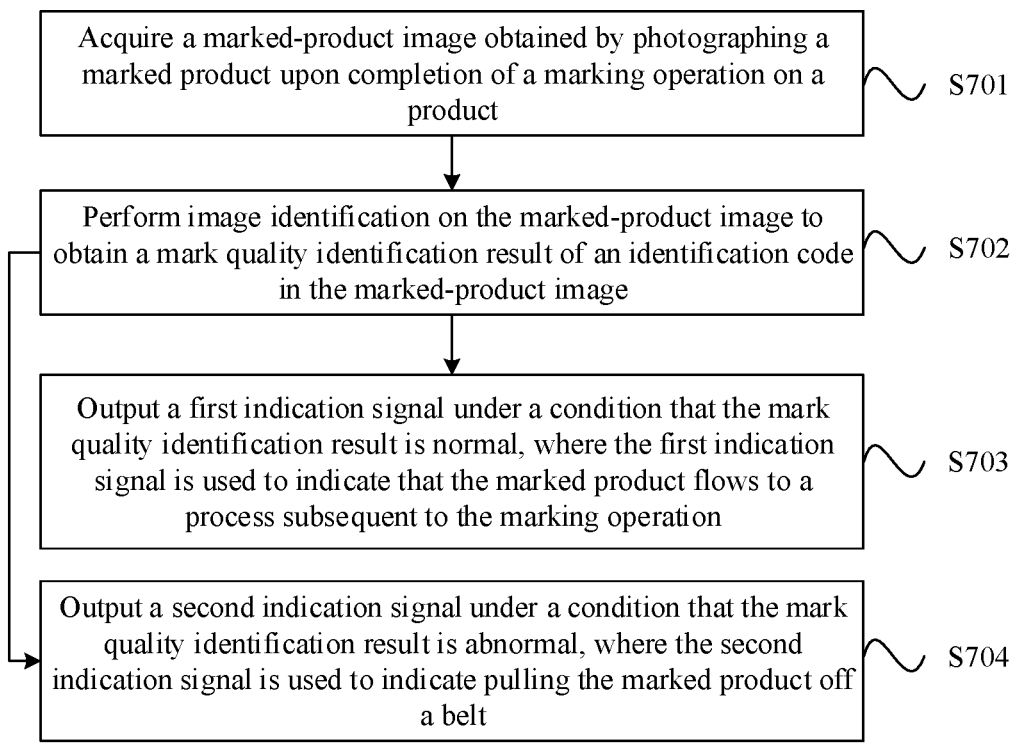
FIG. 13 a schematic flowchart of a mark quality inspection method according to some other embodiments of this application.

According to some embodiments of this application, optionally, referring to FIG. 13, the mark quality inspection method further includes the following step.

Step S704. Output a second indication signal under a condition that the mark quality identification result is abnormal, where the second indication signal is used to indicate pulling the marked product off a belt.

With reference to the foregoing embodiments, it is determined that the mark quality identification result is abnormal when any one of the following conditions is met: the image consistency comparison result is being inconsistent, the mark size identification result is not conforming to the preset size range, the mark position detection result is deviating from the mark position, and the digital code comparison result is being inconsistent. In this case, the second indication signal is output.

The mark quality identification result is abnormal, indicating that the identification result is that the mark quality does not meet the requirements. In this case, the second indication signal is output so that the marked product is pulled off the belt, reducing the possibility that the marked product with non-conforming mark quality flows to the next process. In some embodiments, the belt may be an NG belt for pulling out non-conforming products.

Therefore, when the mark quality identification result is abnormal, it can be indicated in a timely manner to pull the marked product off the belt, reducing the possibility that a marked product with an abnormal mark flows to the next process.

Figure 14:
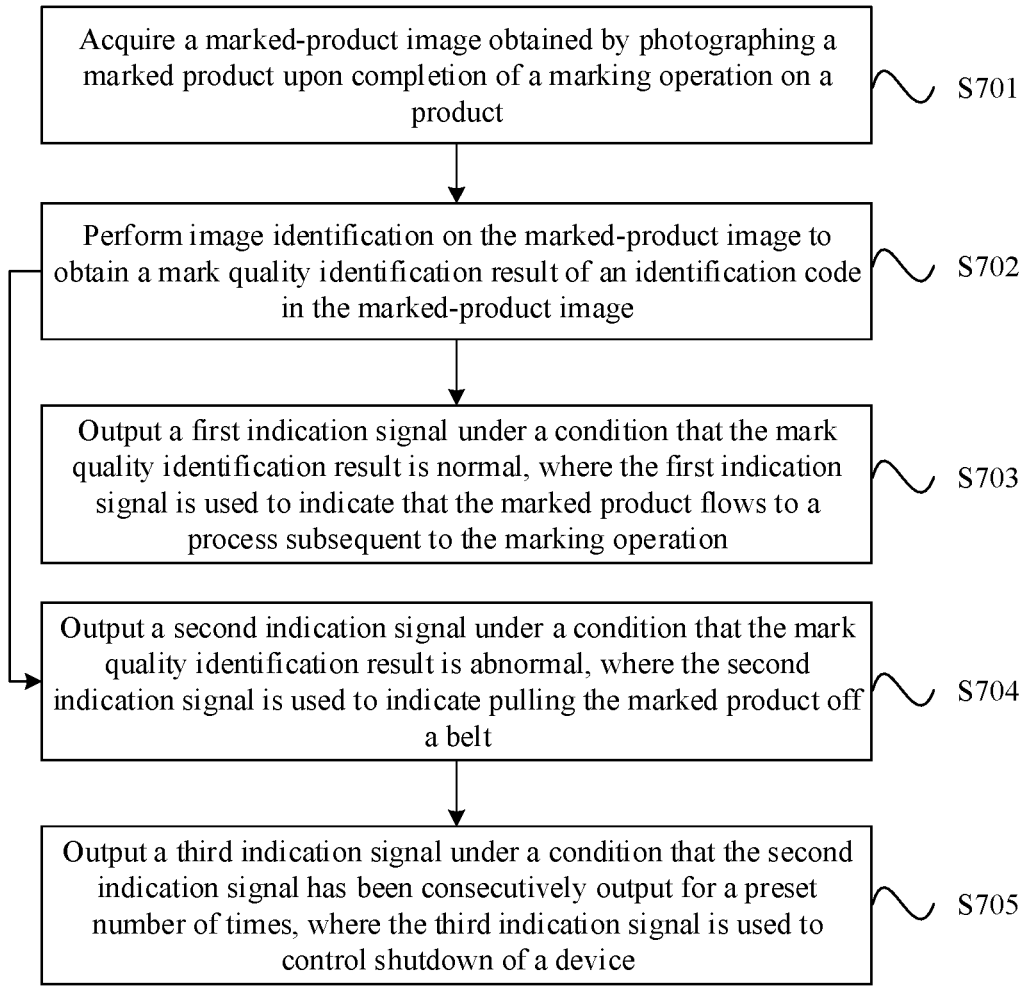
FIG. 14 is a schematic flowchart of a mark quality inspection method according to some other embodiments of this application.

According to some embodiments of this application, optionally, referring to FIG. 14, the mark quality inspection method further includes the following step.

Step S705. Output a third indication signal under a condition that the second indication signal has been consecutively output for a preset number of times, where the third indication signal is used to control shutdown of a device.

The preset number may be set based on actual needs. A smaller preset number indicates a probability of finding and reducing batch accidents as earlier as possible during marking. For example, in some embodiments, the preset number may be set to three times. The control device is a device for controlling the entire flow of product generation, for example, a master control device or a host computer.

In this way, when the mark quality identification result is abnormal for the preset number of consecutive times, it can be indicated in a timely manner that the device needs to be shut down and repaired, so as to reduce mass production accidents during marking.

According to some embodiments of this application, the following describes some specific implementations based on an example in which the product is a lithium battery, the mark quality inspection is performed during lithium battery production, and the identification code is a quick response code.

During production and manufacturing of lithium batteries, the marking operation needs to be performed on finished lithium batteries by using a marking device, so as to engrave a quick response code on a surface of the lithium batteries.

Before the marking operation is performed on each lithium battery, the master control device or the host computer needs to send, to the marking device and the inspection device, the quick response code to be engraved on the lithium battery (namely, the foregoing identification code mark image), as well as the digital code content corresponding to the product. The marking device obtains the quick response code and the digital code content, and engraves them onto the lithium battery at the current work station according to a set position and manner. The inspection device obtains the quick response code, and compares the quick response code against a quick response code image identified from the marked-product image (namely, the foregoing identification code image) to detect whether the quick response code engraved on the lithium battery is complete. The inspection device obtains the digital code content, and compares the digital code content against the digital code identified from the marked-product image to check the consistency with the digital code content.

After the marking device completes the marking operation on the lithium battery based on the received quick response code and the digital code content, the photographing apparatus photographs the lithium battery on which the marking operation is completed to obtain a marked-product image, and then sends the marked-product image to the inspection device. The inspection device performs mark quality inspection based on the marked-product image.

Specifically, the inspection device identifies the quick response code image in the marked-product image, and compares whether the quick response code image is consistent with the image of the quick response code received from the master control device or the host computer, to obtain an image consistency comparison result. The inspection device also determines the quick response code size information of the quick response code image from the marked-product image, and compares the quick response code size information against the preset size range to obtain a mark size identification result. The inspection device also determines the mark position information of the identified quick response code image on the lithium battery. The mark position information includes: a first distance of the identification code image with respect to a first product boundary of the lithium battery, and a second distance with respect to a second product boundary of the lithium battery. The first distance is compared against the first preset distance range and the second distance is compared against the second preset distance range to obtain a mark position detection result. The inspection device also identifies the digital code in the marked-product image, and compares whether the digital code is consistent with the digital code content corresponding to the product, to obtain a digital code comparison result.

It is determined that the mark quality identification result is normal when the image consistency comparison result is being consistent, the mark size identification result is conforming to the preset size range, the mark position detection result is no deviation from the mark position, and the digital code comparison result is being consistent. In this case, the first indication signal is output to indicate that the marked product flows to a process subsequent to the marking operation.

Otherwise, it is determined that the mark quality identification result is abnormal when any one of the following four conditions is met: the image consistency comparison result is being inconsistent, the mark size identification result is not conforming to the preset size range, the mark position detection result is deviating from the mark position, and the digital code comparison result is being inconsistent. In this case, the second indication signal is output to indicate that the marked product is pulled off the belt, reducing the possibility that a marked product with an abnormal mark flows to the next process.

The foregoing mark quality inspection process is executed on each lithium battery to be marked. When the second indication signal has been consecutively output for a preset number of times, that is, a mark quality problem is consecutively found on the preset number of lithium batteries, it indicates that the risk of unsatisfactory mark quality is present on a batch of products. In this case, the third indication signal is output to control the device to shut down and stop the marking operation, so that troubleshooting and repair can be performed.

It should be understood that although the steps in the foregoing flowcharts according to the embodiments are displayed in an order as indicated by the arrows, these steps are not necessarily executed in the order indicated by the arrows. Unless otherwise specified herein, the execution of these steps is not strictly limited to such order, and these steps can be executed in another order. In addition, at least some of the steps in the foregoing flowcharts according to the embodiments may include multiple steps or stages. These steps or stages are not necessarily executed simultaneously but may be executed at different points of time, and the order of executing these steps or stages is not mandatory either. Instead, the execution of them may alternate with execution of other steps or at least part of steps or stages in other steps.

Based on the same inventive concept, an embodiment of this application further provides a mark quality inspection apparatus for implementing the foregoing mark quality inspection method. The solution provided by the apparatus is similar to the solution described in the foregoing method. Therefore, the specific limitations in one or more embodiments of the mark quality inspection method provided below can be found in the limitations on the foregoing mark quality inspection method, and are not repeated herein.

Figure 15:
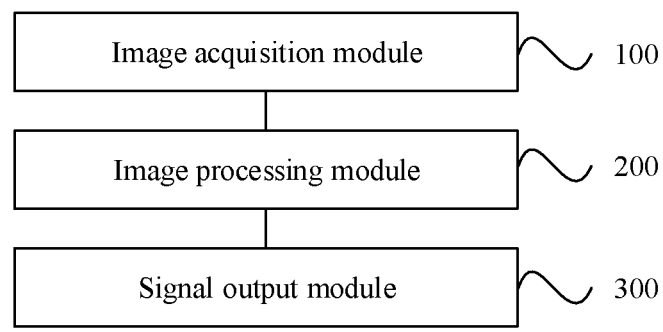
FIG. 15 a block diagram of a structure of a mark quality inspection apparatus according to some embodiments of this application.

In some embodiments, referring to FIG. 15, a mark quality inspection apparatus is provided, including an image acquisition module 100, an image processing module 200, and a signal output module 300.

The image acquisition module 100 is configured to acquire a marked-product image obtained by photographing a marked product upon completion of a marking operation on a product.

The image processing module 200 is configured to perform image identification on the marked-product image to obtain a mark quality identification result of an identification code in the marked-product image.

The signal output module 300 is configured to output a first indication signal when the mark quality identification result obtained by the image processing module 200 is normal, where the first indication signal is used to indicate that the marked product flows to a process subsequent to the marking operation.

In some embodiments, the image processing module 200 is configured to: identify an identification code image in the marked-product image and compare whether the identification code image is consistent with an identification code mark image corresponding to the product to obtain an image consistency comparison result. The mark quality identification result includes the image consistency comparison result.

In some embodiments, the image processing module 200 is configured to determine identification code size information of the identification code image and compare the identification code size information against a preset size range to obtain a mark size identification result. The mark quality identification result includes the mark size identification result.

In some embodiments, the image processing module 200 is configured to determine mark position information of the identified identification code image in the marked product and obtain a mark position detection result based on the mark position information. The mark quality identification result includes the mark position detection result.

In some embodiments, the mark position information includes: a first distance of the identification code image with respect to a first product boundary of the marked product, and a second distance with respect to a second product boundary of the marked product.

The image processing module 200 is configured to: when the first distance falls within a first preset distance range and the second distance falls within a second preset distance range, determine that the mark position detection result is the mark position being accurate.

In some embodiments, the image processing module 200 is configured to identify the digital code in the marked-product image and compares whether the digital code is consistent with the digital code content corresponding to the product, to obtain a digital code comparison result. The mark quality identification result includes the digital code comparison result.

In some embodiments, the signal output module 300 is configured to output a second indication signal when the mark quality identification result obtained by the image processing module 200 is abnormal. The second indication signal is used to indicate pulling the marked product off a belt.

In some embodiments, the signal output module 300 is configured to output a third indication signal under a condition that the second indication signal has been consecutively output for a preset number of times, where the third indication signal is used to control shutdown of a device.

The modules in the mark quality inspection apparatus may be implemented as a whole or partially by software, hardware and a combination thereof. The foregoing modules may be embedded in or provided independent of a processor of a computer device in the form of hardware, and may also be stored in a memory of the computer device in the form of software, so that the processor can invoke the modules to perform the corresponding operations of the modules.

In some embodiments, a computer device is provided. With the computer device, the inspection device 40 can be implemented. The computer device may be a terminal, with an internal structure illustrated in FIG. 16. The computer device includes a processor, a memory, a communications interface, a display, and an input apparatus that are connected via a system bus. The processor of the computer device is used to provide computing and control capabilities. The memory of the computer device includes a non-volatile storage medium or an internal memory. The non-volatile storage medium stores an operating system and computer programs. The internal memory provides an environment for operation of the operating system and the computer programs in the non-volatile storage medium. The communications interface of the computer device is used for wired or wireless communication with an external device, for example, communication with a marking device and a photographing apparatus, where the wireless communication may be implemented by means of WiFi, an operator network, NFC (near field communication), or other technologies. The computer programs are executed by the processor to implement a mark quality inspection method. The display of the computer device may be a liquid crystal display or an electronic ink display. The input apparatus of the computer device may be a touch layer covered on the display, a button, a trackball, or touch panel provided on the housing of the computer device, or an external keyboard, touch panel, a mouse, or the like.

Figure 16:
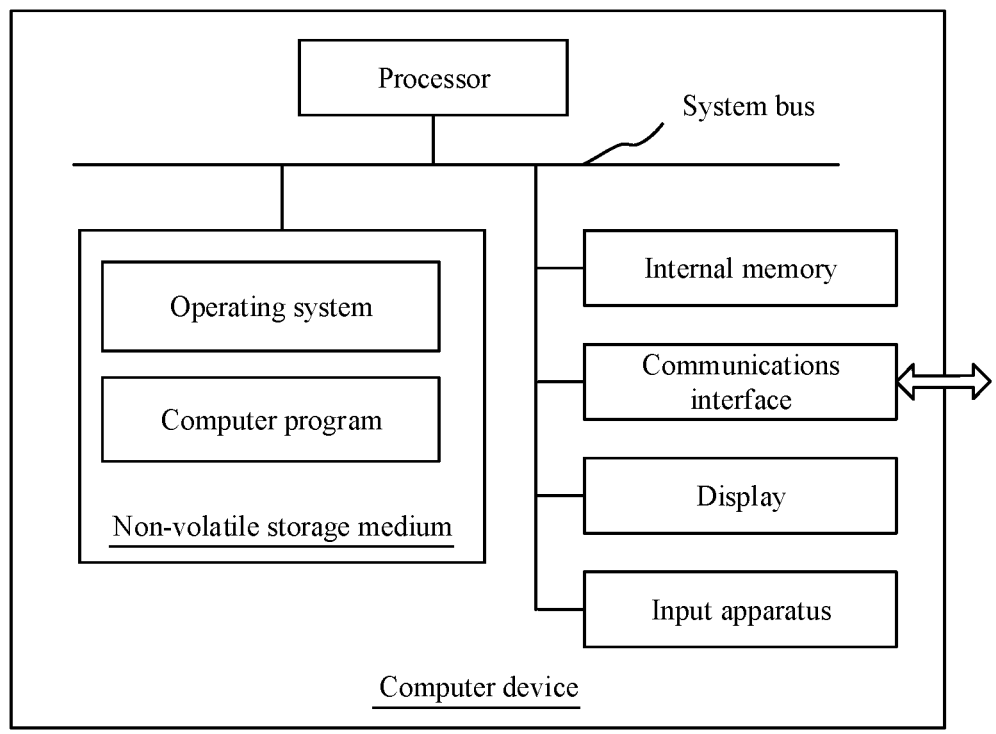
FIG. 16 is a diagram of an internal structure of a computer device according to some embodiments of this application.

Persons skilled in the art can understand that the structure illustrated in FIG. 16 is merely a block diagram of part of the structure associated with the solution in this application, and does not constitute limitations on the computer device, to which the solution in this application is applied. A specific computer device may include more or fewer components than as shown in the figure, be combined with some components, or have components arranged in a different manner.

In some embodiments, a computer device is provided including a memory and one or more processors. The memory stores computer-readable instructions, and when the computer-readable instructions are executed by the one or more processors, the steps of the mark quality inspection method according to any one of the foregoing embodiments are executed by the one or more processors.

In some embodiments, one or more computer-readable storage media storing computer-readable instructions are provided. When the computer-readable instructions are executed by one or more processors, the steps of the mark quality inspection method according to any one of the foregoing embodiments are executed by the one or more processors.

In some embodiments, a computer program product is provided. The computer program product includes a computer program. When the computer program is executed by one or more processors, the steps of the mark quality inspection method according to any one of the foregoing embodiments are executed by the one or more processors.

Persons of ordinary skill in the art may understand that all or some of the processes of the method in the embodiments may be implemented by relevant hardware instructed by a computer program. The computer program may be stored in a non-volatile computer readable storage medium. When the computer program is executed, the processes of the method embodiments may be included. Any reference to the memory, storage, database, or other media used in the embodiments of this application may include at least one of a non-volatile memory and a volatile memory. The non-volatile memory may include a read-only memory (Read-Only Memory, ROM), a magnetic tape, a floppy disk, a flash memory, an optical memory, or the like. The volatile memory may include a random access memory (Random Access Memory, RAM) or an external cache memory. As a description rather than a limitation, the RAM may be in various forms, such as a static random access memory (Static Random Access Memory, SRAM) or a dynamic random access memory (Dynamic Random Access Memory, DRAM).

In conclusion, it should be noted that the foregoing embodiments are merely intended to describe the technical solutions of this application, rather than to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application. All these modifications and replacements should fall within the scope of claims and specification of this application. In particular, in absence of structural conflict, the various technical features mentioned in the embodiments can be combined in any manner. This application is not limited to the specific embodiments disclosed in this specification but includes all technical solutions falling within the scope of the claims.

The invention claimed is:

1. A mark quality inspection method, comprising:
   acquiring a marked-product image obtained by photographing a marked product upon completion of a marking operation on a product;
   identifying an identification code image in the marked-product image;
   comparing whether the identification code image is consistent with an identification code mark image corresponding to the product to obtain an image consistency comparison result;
   performing image identification on the marked-product image to obtain a mark quality identification result of an identification code in the marked-product image, the mark quality identification result comprising the image consistency comparison result; and
   outputting a first indication signal under a condition that the mark quality identification result is normal, wherein the first indication signal is used to indicate that the marked product flows to a process subsequent to the marking operation.

2. The method according to claim 1, wherein the performing image identification on the marked-product image to obtain a mark quality identification result of an identification code in the marked-product image further comprises:
   determining identification code size information of the identification code image; and
   comparing the identification code size information against a preset size range to obtain a mark size identification result; wherein
   the mark quality identification result comprises the mark size identification result.

3. The method according to claim 1, wherein the performing image identification on the marked-product image to obtain a mark quality identification result of an identification code in the marked-product image further comprises:
   determining mark position information of the identified identification code image in the marked product; and
   obtaining a mark position detection result based on the mark position information; wherein
   the mark quality identification result comprises the mark position detection result.

4. The method according to claim 3, wherein the mark position information comprises: a first distance of the identification code image with respect to a first product boundary of the marked product, and a second distance with respect to a second product boundary of the marked product; and
   the obtaining a mark position detection result based on the mark position information comprises:
   under a condition that the first distance falls within a first preset distance range and the second distance falls within a second preset distance range, determining that the mark position detection result is the mark position being accurate.

5. The method according to claim 1, wherein the performing image identification on the marked-product image to obtain a mark quality identification result of an identification code in the marked-product image comprises:
   identifying a digital code in the marked-product image; and
   comparing whether the digital code is consistent with digital code content corresponding to the product to obtain a digital code comparison result; wherein
   the mark quality identification result comprises the digital code comparison result.

6. The method according to claim 1, wherein the method further comprises:
outputting a second indication signal under a condition that the mark quality identification result is abnormal, wherein the second indication signal is used to indicate pulling the marked product off a belt.

7. The method according to claim 6, wherein the method further comprises:
outputting a third indication signal under a condition that the second indication signal has been consecutively output for a preset number of times, wherein the third indication signal is used to control shutdown of a device.

8. A mark quality inspection apparatus, comprising:
an image acquisition module, configured to acquire a marked-product image obtained by photographing a marked product upon completion of a marking operation on a product;
an image processing module, configured to:
identify an identification code image in the marked-product image;
compare whether the identification code image is consistent with an identification code mark image corresponding to the product to obtain an image consistency comparison result; and
perform image identification on the marked-product image to obtain a mark quality identification result of an identification code in the marked-product image, the mark quality identification result comprising the image consistency comparison result; and
a signal output module, configured to output a first indication signal under a condition that the mark quality identification result obtained by the image processing module is normal, wherein the first indication signal is used to indicate that the marked product flows to a process subsequent to the marking operation.

9. The mark quality inspection apparatus according to claim 8, wherein the image processing module is further configured to:
determine identification code size information of the identification code image; and
compare the identification code size information against a preset size range to obtain a mark size identification result; wherein
the mark quality identification result comprises the mark size identification result.

10. The mark quality inspection apparatus according to claim 8, wherein the image processing module is further configured to:
determine mark position information of the identified identification code image in the marked product; and
obtain a mark position detection result based on the mark position information; wherein the mark quality identification result comprises the mark position detection result.

11. The mark quality inspection apparatus according to claim 10, wherein the mark position information comprises:
a first distance of the identification code image with respect to a first product boundary of the marked product, and a second distance with respect to a second product boundary of the marked product; and
the image processing module is further configured to determine that the mark position detection result is the mark position being accurate, under a condition that the first distance falls within a first preset distance range and the second distance falls within a second preset distance range.

12. The mark quality inspection apparatus according to claim 8, wherein the image processing module is further configured to:
identify a digital code in the marked-product image; and
compare whether the digital code is consistent with digital code content corresponding to the product to obtain a digital code comparison result; wherein
the mark quality identification result comprises the digital code comparison result.

13. The mark quality inspection apparatus according to claim 8, wherein the single output module is further configured to:
output a second indication signal under a condition that the mark quality identification result is abnormal, wherein the second indication signal is used to indicate pulling the marked product off a belt.

14. The mark quality inspection apparatus according to claim 13, wherein the single output module is further configured to:
output a third indication signal under a condition that the second indication signal has been consecutively output for a preset number of times, wherein the third indication signal is used to control shutdown of a device.

15. A computer device comprising a memory and one or more processors, wherein the memory stores computer-readable instructions, and the computer-readable instructions when executed by the one or more processors, cause the one or more processors to perform:
acquiring a marked-product image obtained by photographing a marked product upon completion of a marking operation on a product;
identifying an identification code image in the marked-product image;
comparing whether the identification code image is consistent with an identification code mark image corresponding to the product to obtain an image consistency comparison result;
performing image identification on the marked-product image to obtain a mark quality identification result of an identification code in the marked-product image, the mark quality identification result comprising the image consistency comparison result; and
outputting a first indication signal under a condition that the mark quality identification result is normal, wherein the first indication signal is used to indicate that the marked product flows to a process subsequent to the marking operation.

16. The computer device according to claim 15, wherein the computer-readable instructions when executed by the one or more processors, further cause the one or more processors to perform:
determining identification code size information of the identification code image; and
comparing the identification code size information against a preset size range to obtain a mark size identification result; wherein
the mark quality identification result comprises the mark size identification result.

17. The computer device according to claim 15, wherein the computer-readable instructions when executed by the one or more processors, further cause the one or more processors to perform:
determining mark position information of the identified identification code image in the marked product; and
obtaining a mark position detection result based on the mark position information; wherein the mark quality identification result comprises the mark position detection result.

18. One or more non-transitory computer-readable storage media storing computer-readable instructions, wherein the computer-readable instructions when executed by the one or more processors, cause the one or more processors to perform:
- acquiring a marked-product image obtained by photographing a marked product upon completion of a marking operation on a product;
- identifying an identification code image in the marked-product image;
- comparing whether the identification code image is consistent with an identification code mark image corresponding to the product to obtain an image consistency comparison result;
- performing image identification on the marked-product image to obtain a mark quality identification result of an identification code in the marked-product image, the mark quality identification result comprising the image consistency comparison result; and
- outputting a first indication signal under a condition that the mark quality identification result is normal, wherein the first indication signal is used to indicate that the marked product flows to a process subsequent to the marking operation.

* * * * *